United States Patent
Jessen et al.

(10) Patent No.: US 8,331,730 B2
(45) Date of Patent: Dec. 11, 2012

(54) SYSTEMS AND METHODS TO INCREASE SPEED OF OBJECT DETECTION IN A DIGITAL IMAGE

(75) Inventors: Clay Jessen, Fort Collins, CO (US); Daniel Bloom, Loveland, CO (US); Darryl Greig, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 275 days.

(21) Appl. No.: 12/933,306

(22) PCT Filed: Apr. 1, 2008

(86) PCT No.: PCT/US2008/059064
§ 371 (c)(1),
(2), (4) Date: Nov. 8, 2010

(87) PCT Pub. No.: WO2009/123628
PCT Pub. Date: Oct. 8, 2009

(65) Prior Publication Data
US 2011/0044545 A1    Feb. 24, 2011

(51) Int. Cl.
*G06K 9/36* (2006.01)
(52) U.S. Cl. .................... 382/286; 382/276
(58) Field of Classification Search .............. 382/100, 382/190, 286
See application file for complete search history.

(56) References Cited

U.S. PATENT DOCUMENTS

| | | | |
|---|---|---|---|
| 7,020,337 B2 * | 3/2006 | Viola et al. | 382/224 |
| 7,269,292 B2 | 9/2007 | Steinberg | |
| 7,315,630 B2 | 1/2008 | Steinberg et al. | |
| 7,315,631 B1 * | 1/2008 | Corcoran et al. | 382/118 |
| 7,317,815 B2 | 1/2008 | Steinberg et al. | |
| 7,912,363 B2 * | 3/2011 | Minato et al. | 396/123 |
| 8,055,029 B2 * | 11/2011 | Petrescu et al. | 382/118 |
| 8,175,447 B2 * | 5/2012 | Takaiwa | 396/48 |

OTHER PUBLICATIONS

International Search Report. Date of Mailing Nov. 20, 2008. International Application No. PCT/US2008/059064. International Filing Date Apr. 1, 2008.

* cited by examiner

*Primary Examiner* — Bhavesh Mehta
*Assistant Examiner* — Shefali Goradia

(57) ABSTRACT

Systems and methods are disclosed that determine a largest patch size to traverse a digital image, analyze the digital image to detect one or more first objects of a size approximately the same as the largest patch size, and discontinue analyzing the digital image when the digital image includes the first object(s) of a size approximately the same as the largest patch size. The patch size is decremented to progressively smaller patch sizes if the first object(s) of a size approximately the same as the largest patch size is not detected and the digital image is further analyzed to detect one or more first objects of a size approximately the same as the smaller patch size until the first object(s) are detected or the patch size is decremented below a predetermined smallest size.

21 Claims, 3 Drawing Sheets

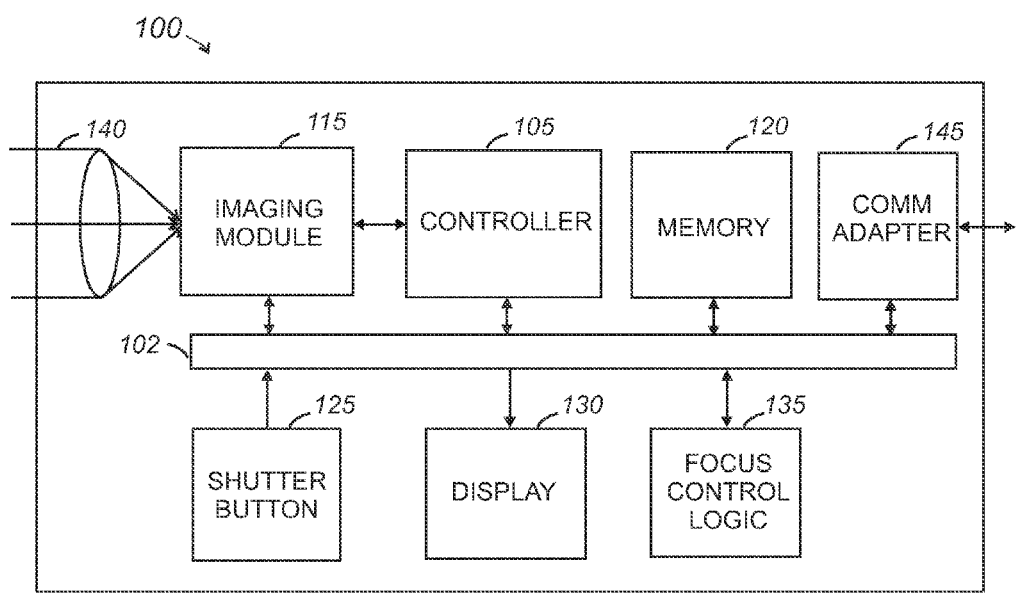
FIG. 1
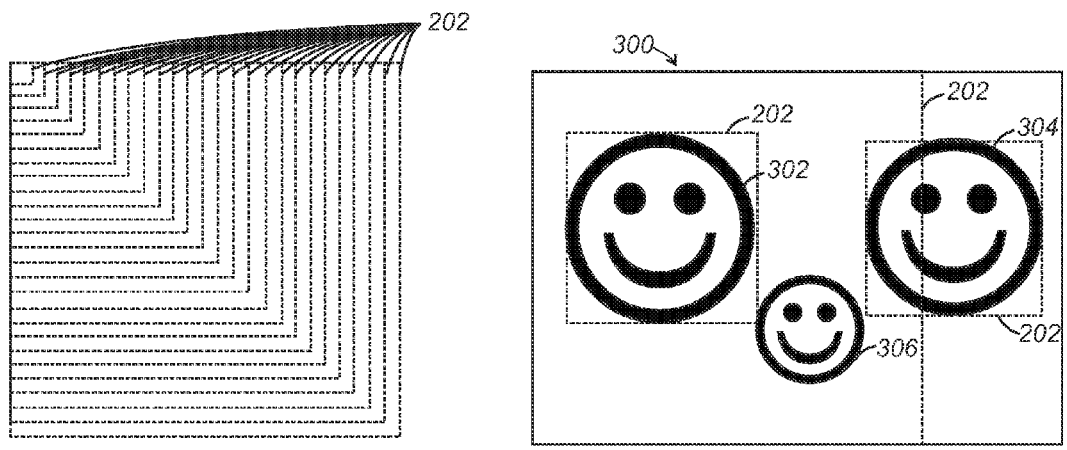
FIG. 2
FIG. 3

SYSTEMS AND METHODS TO INCREASE SPEED OF OBJECT DETECTION IN A DIGITAL IMAGE

BACKGROUND

Some imaging devices include passive auto-focus techniques with object recognition logic to detect an object of interest as the focal point instead of using a static or user-selected focus areas. Object detection in digital imaging devices is computationally intensive and processing speeds are slow compared to processing requirements. Further, if the detection logic is too slow, the objects in the image may move to different locations before results for the previous scene are available.

During detection, the field of view is divided into patches and objects are typically searched for by examining every individual patch at a particular size in an image, left to right, top to bottom. The patch size is then increased or decreased and the entire image is traversed again, repeating however many times necessary until all possible patches have been examined. Patch sizes range from small (for distances far from the camera lens) to large (for distances close to the camera lens). When the size of the patch being evaluated is large, the number of patches that need to be evaluated to traverse the image is small. When the size of the patch being evaluated is small, the number of patches that need to be evaluated to traverse the image is large. Because of the difference in patch sizes, and hence the difference in the number of patches that need to be evaluated, it takes much more time to traverse an image when evaluating small patch sizes than it does to traverse the same image when evaluating large patch sizes. Current solutions have no preference in finding either small objects or large objects. The disadvantage of this lack of preference means that it always takes roughly the same amount of time to run the entire object detection.

SUMMARY

Systems and methods are disclosed that determine a largest patch size to traverse a digital image, analyze the digital image to detect one or more objects of a size approximately the same as the largest patch size, and discontinue analyzing the digital image when the digital image includes the object (s) of a size approximately the same as the largest patch size. The patch size is decremented to progressively smaller patch sizes if object(s) of a size approximately the same as the largest patch size are not detected and analyzing the digital image to detect one or more objects of a size approximately the same as the smaller patch size until object(s) are detected or the patch size is decremented below a predetermined smallest size.

BRIEF DESCRIPTION OF THE DRAWINGS

Embodiments of the invention relating to both structure and method of operation may best be understood by referring to the following description and accompanying drawings.

FIG. 1 is a functional block diagram of an embodiment of a digital imaging device.

FIG. 2 shows an example of a series of incrementally smaller patches that can be used to traverse across and up/down a digital image, beginning with the largest patch.

FIG. 3 shows an example of a digital image including three objects that detection logic in focus control logic may be capable of detecting using different sizes of the patches shown in FIG. 2.

DETAILED DESCRIPTION

Figure 4:
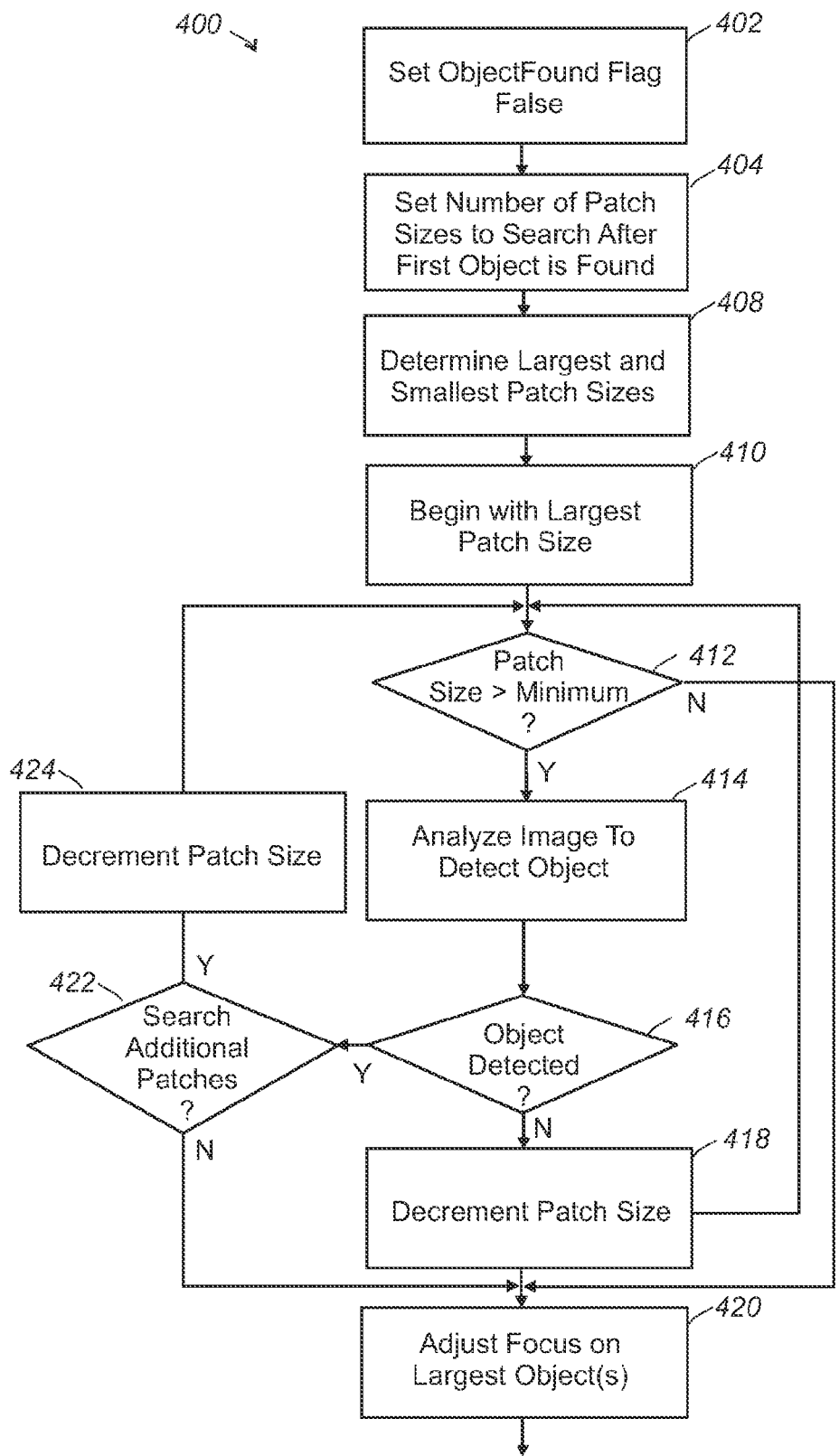
FIG. 4 is a flow chart illustrating an embodiment of automated methods for detecting an object in a digital image.

Systems and methods for object detection disclosed herein search a digital image for large objects before smaller objects. In an image with both large and small objects present, it is assumed that the large object(s) are more likely to belong to the subject of the image. The small object(s) are assumed to belong to someone or something of less interest in the image, perhaps a person or other object in the background.

In some aspects, object detection logic searches for objects such as faces at the largest possible patch size. The largest patch size is typically a size just below the smaller of the width or height of the image. The entire image may be traversed from left to right, top to bottom, or other suitable directions, and a flag is set to indicate whether any objects were found at that particular patch size. If an object is not found, the patch size is decreased by a set amount, and the image is traversed again. This process is repeated until either one or more objects are found or a minimum patch size is reached. If an object is found, a flag is set and the search for other objects at that particular patch size is completed. At the end of the traversal, the logic jumps out of its traversal loop and returns based on the flag, thereby skipping all patch sizes smaller than the patch size at which an object was found. In some embodiments, patch sizes one or more sizes smaller than the patch size at which object(s) were found can be analyzed.

FIG. 1 is a functional block diagram of an apparatus for a digital imaging device 100 in accordance with an illustrative embodiment of the invention. Digital imaging device 100 may be any device capable of converting an optical image of a scene to a digital image. Examples include, without limitation, digital cameras, digital camcorders, personal digital assistants (PDAs) with digital camera functionality, and radiotelephones (e.g., cellular or PCS phones) with digital camera functionality. Imaging device 100 includes data bus 102 coupled to controller 105, imaging module 115, memory device 120, shutter button 125, display device 130, focus control module 135, and communication adapter 145. Optical system 140 is configured to provide image signals to imaging module 115. Controller 105 may be implemented using a microprocessor or microcontroller and may communicate over data bus 102 with imaging module 115, memory 120, shutter button 125, display 130, focus control logic 135, and communication adapter 145. Digital imaging device 100 may include other input controls (not shown in FIG. 1) besides shutter button 125. For example, digital imaging device 100 may have navigational buttons for browsing menus and captured digital images or other input controls for controlling the operation of digital imaging device 100. Display 130 may be, for example, a liquid crystal display (LCD) or other suitable display device.

Focus control logic 135 can include logic to implement an autofocus feature for automatically focusing optical system 140 (e.g., one or more lenses). Particular aspects of focus control logic 135 will be explained in greater detail in later portions of this detailed description. In some embodiments, focus control logic 135 is implemented in firmware that is part of memory 120. For example, focus control logic 135 may comprise firmware program instructions that are executed by controller 105. In general, focus control logic 135 may be implemented in hardware, software, firmware, or any combination thereof.

Optical system 140 produces optical images that may be converted to digital images by imaging module 115. Imaging module 115 can include an image sensing device. In one example, the image sensing device can be embodied as a charge-coupled device (CCD) array of light sensitive elements which convert photons representing the intensity of received light to computer readable data. Imaging module 115 can include exposure control logic to regulate an aperture and shutter (not shown) on imaging device 110 for regulating the exposure of the image upon the image sensing device. A flash unit (not shown) can also be provided for illuminating the image when ambient light is insufficient.

Optical system 140 can also include a multiple aperture filter optically coupled and aligned with the image sensing device. During autofocus, light received by the optical system 140 is filtered by the multiple aperture filter resulting in multiple image representations of the same image on the image sensing device. The multiple aperture filter effects the distribution of light on the image sensing device that varies with defocus. The image sensing device detects this distribution of light and represents it as computer readable data usable by the focus control logic 135 in determining and adjusting focus.

Imaging device 100 can also include one or more communication adapters 145 for connecting imaging device 100 directly to an information storage/processing system, such as a user workstation, and/or an information network, such as the Internet. Communication adapter 145 may be configured for wireless and/or wired communication.

In digital imaging device 100, autofocus logic in focus control logic 135 may be operative during the composition of a picture, for example, during a "live preview" mode of digital imaging device 100. An autofocus algorithm typically uses a figure of merit such as "sum modulus difference" to evaluate various focus positions of the lens. In one common approach referred to as "continuous autofocus," the autofocus system is active continually during the composition of an image (e.g., throughout "live preview" mode). More efficient variations of continuous autofocus may be used in which the autofocus system is capable of adjusting focus at any time during composition but does so only when truly necessary (e.g., when the digital imaging device detects a change in the scene during live preview). During preview modes, focus control logic 135 accesses image data from imaging module 115, however focus control logic 135 may also access image data stored in memory device 120.

Note that other image processing functionality can be included in imaging device 100 that may be aided by rapidly detecting the largest object(s) in an image, such as red-eye correction, brightness/contrast balancing, sharpening or blurring, RGB and hue/saturation adjust, add noise, invert, exposure and white balance fix, yellow filter, aging, yellow skin tone reduction, anti distortion, digital noise reduction, night noise reduction, among others.

In some aspects, focus control logic 135 determines the largest patch size to traverse the digital image. For example, focus control logic 135 can determine the overall dimensions of the image and set the largest patch size to approximately the smaller of the width and height dimensions. Referring to FIGS. 2 and 3, FIG. 2 shows an example of a series of incrementally smaller patches 202 that can be used to traverse across and up/down the digital image, beginning with largest patch 202. Patch 202 may have any suitable shape including, but not limited to, a square or a rectangle. Further, the decrement for each progressively smaller size of patch 202 may be selected based on a number of factors, such as the processing resources available, the size of the digital image, and the desired accuracy, among others.

FIG. 3 shows an example of a digital image 300 including three objects 302, 304, 306 that detection logic in focus control logic 135 may be capable of detecting. In the example shown, objects 302, 304, 306 are faces and focus control logic 135 includes face detection logic. A variety of object detection techniques suitable for use in focus control logic 135 are known and continue to be developed. One or more of object detection/recognition techniques may be utilized in focus control logic 135. As an example the cascade of homogeneous classifiers using haar-like features described in Viola, P & Jones, M, "Robust Real-Time Face Detection", International Journal of Computer Vision 57(2), 137-154, 2004 and derivations thereof may be used to detect a range of objects, including faces, cars, pedestrians, or to perform face recognition.

Focus control logic 135 moves patch 202 across and up/down the digital image 300 and analyzes the area of the digital image enclosed by the patch 202 to detect object(s) of a size approximately the same size as the largest patch 202. If one or more object(s) are detected, focus control logic 135 may discontinue analyzing the digital image 300. If object(s) are not detected at the largest patch size, focus control logic 135 progressively decrements the size of patch 202 and analyzes the digital image 300 to detect one or more object of a size approximately the same as one of the smaller patch sizes until one or more objects are detected or the size of patch 202 is decremented below a minimum patch size. In the example shown, face 302 is larger than face 304 or 306, but smaller than the largest size of patch 202. Accordingly, focus control logic 135 decrements the size of patch 202 until focus control logic 135 detects one or more objects 302 approximately the same size as patch 202.

In additional aspects, focus control logic 135 can continue analyzing the digital image 300 to determine whether one or more objects that are close to the size of the first object(s) are included in the digital image 300. For example, focus control logic 135 can decrement the size of patch 202 a prespecified number of times to determine whether one or more objects of a size approximately the same as a decremented patch size are included in the digital image 300. In the example shown, patch 202 is decremented once after detecting object 302 and as a result, object 304 is detected since the size of patch 202 and object 304 are approximately the same. Note that the number of objects that can be detected in digital image 300 is not limited to one or two. In some aspects, all objects that are approximately the same as the selected sizes of patches 202 can be detected in digital image 300. In other aspects, the types of objects detected by focus control logic 135 can be limited by the capabilities of the object detection logic included in focus control logic 135.

Once the largest object(s) 302 or objects 302, 304 are detected, focus control logic 135 can issue commands to move lenses in optical system 140 into focus on the largest object(s) 302, or the largest and next largest objects 302, 304. In other aspects, focus control logic 135 may analyze and adjust the focus of object(s) 302, 304 in a digital image 302 stored in memory rather than from imaging module 115. Any suitable technique for determining the optimum level of focus for object 302 or objects 302, 304 can be used. For example, when two or more objects 302, 304 are detected, an average value of the optimum focus level for each object 302, 304 may be used for the entire digital image 300. When only the largest object(s) 302 are detected, the optimum focus level for the largest object(s) 302 may be selected.

Referring to FIG. 4, a flow chart illustrating an embodiment of an automated process or method 400 for detecting an object in a digital image that can be used in focus control logic 135 (FIG. 1) is shown. Process 402 can include initializing an ObjectFound flag false to indicate that an object has not yet been found in the digital image.

While process 400 is typically configured to find the largest object(s) of interest in a digital image, process 400 can also include detecting objects that are slightly smaller than the largest object(s), since two or more objects of similar size may be of equal interest to the viewer. Accordingly, process 404 can include setting a parameter indicating the number of patch sizes to search after a first object is found. The parameter may specify the number of smaller patches and the amount by which to decrement the patch sizes.

Process 408 can include determining a largest patch size that is to be used to traverse the digital image. In some aspects, the patch is square and each side is approximately the size of the minimum of the height and width of the digital image. For example, if the image is 1600 pixels wide and 1200 pixels high, then the size of the largest patch is approximately 1200 pixels square. Note that other suitable criteria can be used to determine the size and shape of the largest patch size as well as successive patch sizes. Process 408 can also include determining the amount by which each successive patch is to be decremented. The decrement may be based on processing resources, the expected sizes of the objects, the resolution of the image, and/or other relevant factors. Process 408 can thus determine the number of patch sizes to be used in analyzing the digital image, including the largest and smallest patch sizes.

Process 410 includes selecting the largest patch size for the starting patch, and process 412 begins a potential loop by determining whether the current patch size is larger than the smallest patch size to be analyzed. If so, process 414 analyzes segments of the digital image according to the position of the patch. The patch can be "moved" to different areas of the digital image using any suitable pattern, such as linearly left to right and down or up, and/or diagonally. The analysis can alternatively begin at the center of the image and move radially outward, or at an edge of the image and move radially inward. Any suitable object detection technique can be used. Further, process 414 can detect one or more different types of objects, such as faces, animals, trees, furniture, flowers, etc., with priority typically given to the largest object(s) for focusing purposes.

Process 416 determines whether process 414 detected one or more objects of a size approximately the same as the patch size currently being used. If not, process 416 transitions to process 418, which decrements the patch size and returns to the start of process 412 to check whether the decremented patch size is still greater than the minimum patch size. If the decremented patch size is less than the minimum patch size, process 412 transitions to the start of process 420, which adjusts focus to the largest object or objects detected. Process 420 can issue commands to move lenses in an optical system into focus on the largest object(s), or the largest and next largest object(s). In other aspects, process 420 may analyze and adjust the focus of the largest object(s) in a digital image stored in memory rather than from an imaging module in an imaging device. Any suitable technique for determining the optimum level of focus for the object(s) can be used. For example, when two or more objects are detected, an average value of the optimum focus level for each object may be used for the entire digital image. When only the largest object(s) are detected, the optimum focus level for the largest object(s) may be selected.

If no objects were detected, process 420 can adjust focus based on other factors, such as the object closest to the digital imaging device, the center of the digital image, and/or other suitable criteria.

If process 416 determines that one or more objects were detected as a result of the analysis in process 414, process 416 transitions to process 422 to determine whether additional smaller patches are to be used to search for objects. Process 422 can include keeping track of the number and/or sizes of patches already used. If all of the patch sizes have already been used, or process 404 indicated that no additional patch sizes are to be analyzed after the largest object(s) in the digital image are found, process 422 can transition to process 420, which adjusts focus to the largest object or objects detected. If all of the patch sizes have not already been used, or process 404 indicated that additional patch sizes are to be analyzed after the largest object(s) in the digital image are found, process 422 can transition to process 424, which decrements the patch size and returns to the start of process 412 to check whether the decremented patch size is still greater than the minimum patch size.

Processes 412-424 are thus repeated until objects corresponding to the largest patch size, and next largest patch size(s) (if any) are detected.

Figure 5:
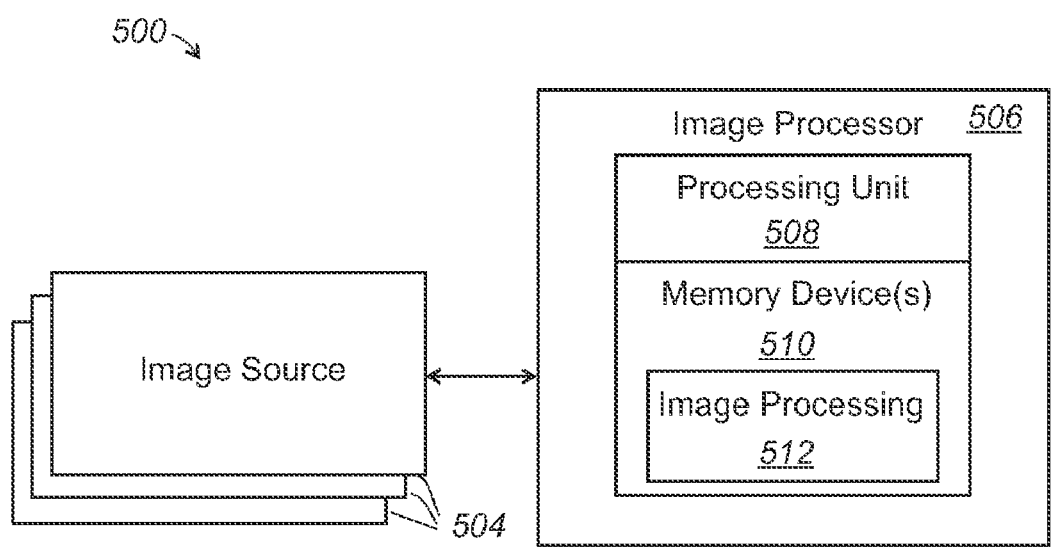
FIG. 5 is a schematic block diagram depicting an embodiment of an article of manufacture capable of detecting an object in a digital image.

FIG. 5 is a schematic block diagram depicting an embodiment of components that can be included in a computer system 500 capable of detecting an object in a digital image. Computer system 500 can include image source 504 coupled to transfer data and instructions to and from image processor 506. Image processor 506 can include processing unit 508, one or more memory devices 510, and image processing module 512. The features of image processing module 512 can include process 400 (FIG. 4) described hereinabove. Image processing module 512 can be used in any context where the focus of attention is on faces (or other objects) of similar size (larger or smaller). In cameras this might be for auto-focus, white balance, gamma correction, composition parameters (auto-mode wheel—e.g., select "portrait", "group photo", etc). It may also be useful for suggesting frame composition (e.g. "move the camera closer and up a bit") and enhancement such as always taking photos with the eyes open. Image processing module 512 can also be used for surveillance and monitoring, counting crowds, etc. In some cases a device may be activated when the presence of one or more faces of a certain size are detected (e.g. photo booth, photo ID station). Image processing module 512 can further be used to detect faces or objects in video streams, as well as still images generated by cameras, scanners, and other digital image sources 504.

The various functions, processes, methods, and operations performed or executed by system 500 can be implemented as programs that are executable on various types of processing units 508 such as controllers, central processing units, microprocessors, digital signal processors, state machines, programmable logic arrays, and the like. The programs such as image processing module 512 can be stored on any computer-readable medium or memory device 510 for use by or in connection with any computer-related system or method. A computer-readable medium is an electronic, magnetic, optical, or other physical memory device 510 or means that can contain or store a computer program such as image processing module 512 for use by or in connection with a computer system 500, method 400 (FIG. 4), process, or procedure. Programs can be embodied in logic instructions that are executed by a computer-readable medium for use by or in connection with an instruction execution system, device, component, element, or apparatus, such as a system based on a computer or processor, or other system that can fetch instructions from an instruction memory or storage of any appropriate type.

Image processor 506 can be configured to interface with image source 504 via suitable communication links such as any one or combination of T1, ISDN, or cable line, a wireless connection through a cellular or satellite network, or a local data transport system such as Ethernet or token ring over a local area network. Image source 504 may be a camera, scanner, data server, processing device with memory and network interface, or other suitable device for storing and communicating digital image data and logic instructions. Various input/output devices, such as keyboard and mouse (not shown), can be included to allow a user to interact with components internal and external to image processor 506 and image source 504. Further, image source 504 can be included internal or external to image processor 506. Image source 504 and image processor 506 may also be included in the same device such as a digital camera, scanner, or other imaging device.

Additionally, image processor 506 can be embodied in any suitable computing device, and so include personal data assistants (PDAs), telephones with display areas, network appliances, desktops, laptops, digital imaging devices, or other such computing devices. Image processor 506 and corresponding logic instructions can be implemented using any suitable combination of hardware, software, and/or firmware, such as microprocessors, Field Programmable Gate Arrays (FPGAs), Application Specific Integrated Circuit (ASICs), or other suitable devices.

In some aspects, image processing module 512 can include means such as logic instructions for
  determining a largest patch size to traverse a digital image,
  analyzing the digital image to detect a first object of a size approximately the same as the largest patch size,
  discontinuing analyzing the digital image when the digital image includes the first object of a size approximately the same as the largest patch size, and
  decrementing the patch size to progressively smaller patch sizes if a first object of a size approximately the same as the largest patch size is not detected and analyzing the digital image to detect a first object of a size approximately the same as the smaller patch size until a first object is detected or the patch size is decremented below a predetermined smallest size.

In additional aspects, image processing module 512 can include means for
  analyzing the digital image to detect a second object of a size approximately the same as a progressively decremented patch size until the second object is detected or the decremented patch size is a predetermined number of decrements smaller than the largest patch size,
  moving an optical lens into focus on the first object if the first object is detected,
  correcting the focus of the digital image, the digital image being accessed from a memory device,
  recognizing that the first object is a human face,
  accessing the digital image from an optical assembly in a digital imaging device before the digital image is recorded, and/or
  adjusting focus between the first and second objects.

Less time is typically required to traverse an image when evaluating large patch sizes than to traverse an image when evaluating small patch sizes. It follows then, that if image processing module 512 starts its search at the largest patch size and works its way down, and finds one or more objects at a large patch size, the processing module 512 can skip some or all smaller patches at the end of the image traversal at that particular patch size. If no large objects are found, the processing module 512 can traverse the image at decreasing patch sizes, until either smaller objects are found or the patch size is smaller than a previously set minimum object size. The time and processing resources required to analyze smaller patch sizes can be saved, while objects of interest are still found.

Note that processing module 512 can determine the location of any number of objects. For example, all the faces in a class photograph would be found because the faces are approximately the same size. Furthermore, by adding a fixed number of resolution reduction steps after the detection of the first object, all pertinent faces in the image can be found without traversing the image using all frame sizes.

One interesting aspect of face detection is that people's faces are of fairly consistent size across the whole population. Detecting a face at a location of an image could be used with other camera parameters to estimate the distance of the face from the camera. The distance estimate could be used during autofocus to reduce the time and processing required to coarse search for the focal distance before fine tuning.

The illustrative block diagrams and flow charts provided herein depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, a few specific examples of dialogs and data models are described. The illustrative system for declarative association of dialog fields can be used with any suitable dialogs or data models. The illustrative techniques may be used with any suitable data processing configuration and with any suitable servers, computers, and devices.

What is claimed is:

1. An apparatus comprising:
  a computer processor;
  a non-transitory computer-readable medium having instructions executable by the computer processor to cause the computer processor to:
  access a digital image;
  determine a largest patch size to traverse the digital image, the largest patch size having a dimension set to approximately the minimum of the digital image's width and height dimensions;
  analyze the digital image to detect whether the digital image includes a one or more first objects of a size approximately the same as the largest patch size;

discontinue analyzing the digital image when the one or more first objects are detected;
if the one or more first objects are not detected at the largest patch size, progressively decrement the patch size and analyze the digital image to detect the one or more first objects of a size approximately the same as one of the smaller patch sizes until the one or more first objects are detected or the patch size is decremented below a minimum patch size.

2. The apparatus according to claim 1 further comprising:
a non-transitory computer-readable medium having instructions executable by the computer processor to cause the computer processor to:
continue analyzing the digital image to detect one or more second objects of a size approximately the same as a decremented patch size until the one or more second objects are detected or the decremented patch size is a predetermined number of decrements smaller than the largest patch size.

3. The apparatus according to claim 2 further comprising:
a non-transitory computer-readable medium having instructions executable by the computer processor to cause the computer processor to:
adjust focus between the one or more first and second objects.

4. The apparatus according to claim 1 further comprising:
a non-transitory computer-readable medium having instructions executable by the computer processor to cause the computer processor to:
issue commands to move an optical lens into focus on the one or more first objects if the one or more first object is detected.

5. The apparatus according to claim 1 further comprising:
a non-transitory computer-readable medium having instructions executable by the computer processor to cause the computer processor to:
correct the focus of the digital image with emphasis on focusing the one or more first objects, the digital image being stored in a memory device.

6. The apparatus according to claim 1 further comprising:
a non-transitory computer-readable medium having instructions executable by the computer processor to cause the computer processor to:
recognize when the one or more first objects are human faces.

7. The apparatus according to claim 1 further comprising:
the apparatus is a digital imaging device.

8. A computer-implemented method comprising:
determining a largest patch size to traverse the digital image;
analyzing the digital image to detect one or more first object(s) of a size approximately the same as the largest patch size;
discontinuing analyzing the digital image when the digital image includes the one or more first object(s) of a size approximately the same as the largest patch size;
decrementing the patch size to progressively smaller patch sizes if one or more first object(s) of a size approximately the same as the largest patch size are not detected and analyzing the digital image to detect one or more first object(s) of a size approximately the same as the smaller patch size until the one or more first object(s) are detected or the patch size is decremented below a predetermined smallest size; and
autofocusing on the one or more first object(s) if the one or more first object(s) are detected in the digital image.

9. The method according to claim 8 further comprising:
analyzing the digital image to detect a second object of a size approximately the same as a progressively decremented patch size until the second object are detected or the decremented patch size is a predetermined number of decrements smaller than the largest patch size.

10. The method according to claim 8 further comprising:
moving an optical lens into focus on the one or more first object(s) if the one or more first object(s) are detected.

11. The method according to claim 8 further comprising:
correcting the focus of the digital image, the digital image being accessed from a memory device.

12. The method according to claim 8 further comprising:
recognizing that one or more of the first objects is a human face.

13. The method according to claim 8 further comprising:
accessing the digital image from an optical assembly in a digital imaging device before the digital image is recorded.

14. The method according to claim 13 further comprising:
adjusting focus between the one or more first and second objects.

15. An article of manufacture comprising:
means for determining a largest patch size to traverse the digital image;
means for analyzing the digital image to detect one or more first objects of a size approximately the same as the largest patch size;
means for discontinuing analyzing the digital image when the digital image includes the one or more first objects of a size approximately the same as the largest patch size;
means for decrementing the patch size to progressively smaller patch sizes if the one or more first objects of a size approximately the same as the largest patch size is not detected and analyzing the digital image to detect one or more first objects of a size approximately the same as the smaller patch size until the one or more first objects are detected or the patch size is decremented below a predetermined smallest size.

16. The article of manufacture according to claim 15 further comprising:
means for analyzing the digital image to detect one or more second objects of a size approximately the same as a progressively decremented patch size until the one or more second objects are detected or the decremented patch size is a predetermined number of decrements smaller than the largest patch size.

17. The article of manufacture according to claim 16 further comprising: means for adjusting focus between the one or more first and second objects.

18. The article of manufacture according to claim 15 further comprising: means for moving an optical lens into focus on the one or more first object if the one or more first object is detected.

19. The article of manufacture according to claim 15 further comprising:
means for correcting the focus of the digital image, the digital image being accessed from a memory device.

20. The article of manufacture according to claim 15 further comprising: means for recognizing that at least one of the one or more first objects is a human face.

21. The article of manufacture according to claim 15 further comprising:
means for accessing the digital image from an optical assembly in a digital imaging device before the digital image is recorded.

* * * * *